April 18, 1967  E. A. BRIGNER ET AL  3,314,285
DEVICE FOR ARRESTING MOVING VEHICLES
Filed Oct. 30, 1964

INVENTORS
EUGENE A. BRIGNER
PHILLIP C. WONDRA
THOMAS W. MIDDLETON
BY C. E. Vautrain Jr., AGENT
G. Baxter Warner,
ATTORNEY

United States Patent Office 3,314,285
Patented Apr. 18, 1967

3,314,285
DEVICE FOR ARRESTING MOVING VEHICLES
Eugene A. Brigner, Camarillo, Phillip C. Wondra, Oxnard, and Thomas W. Middleton, Camarillo, Calif., assignors to the United States of America as represented by the Secretary of the Navy
Filed Oct. 30, 1964, Ser. No. 407,932
10 Claims. (Cl. 73—167)

The invention described herein may be manufactured and used by or for the Government of the United States of America for governmental purposes without the payment of any royalties thereon or therefor.

This invention relates in general to motion arresting means and more particularly to an arrestor for arresting the flight of a test missile.

In the interest of economy it is desirable to provide test facilities for testing various equipment under operating conditions, wherein such facilities will provide retrieval of the item following the test without significant damage to allow repetitive testing, engineering, evaluation, operational integrity, and general information of the test item. This objective is more easily attained in equipment or objects which move at relatively low velocities. However, in the field of missilery, where acceleration is rapid and the forces involved are large it heretofore has not been possible to provide testing of the smaller missiles under conditions which will allow recapture of the missile in substantially undamaged condition after a launching and thrust build up. Some applications where it is desirable and often necessary to have means for testing the launch characteristics of a missile and recovering the missile undamaged thereafter are in the case of small missiles which are launched from a surface or a submerged object and which must be catapulted away from the object before the rocket engines are ignited. Such applications may be launchings from a submarine or from a mobile platform such as an aircraft.

It is a further desire in addition to obtaining launch characteristics to have the missile proceed in free flight for a selected period of time before being captured or recovered. Previous devices for permitting recovery of launched missiles have been unsatisfactory especially in providing the free flight portion of test and also in the complexity of the test equipment. The present invention avoids the shortcomings of current devices while providing an arrestor for both arresting and controlling the attitude of a missile being tested.

The present invention also provides a test device allowing direct measurement of shock, vibration and acceleration levels of an ejection launched missile motor during ignition while the missile is free in space, and during a selected portion of free flight prior to missile arrestment. The present device and method for obtaining test data avoids the considerable expenditure of electronic instrumentation to transmit the measurement data to ground stations and permits recapture of the missile to determine component failure when such occurs. The present method and device also is superior to existing methods of soft mounting and firing of rocket motors to obtain vibration data on ignition and thrust build up thereof.

Accordingly, it is an object of the present invention to provide means for capturing a moving vehicle with insignificant damage to the vehicle.

It is another object of the present invention to provide means for decelerating a launched vehicle and restraining the vehicle from further movement while its energy is being dissipated.

It is a still further object of this invention to provide an arresting means for arresting a launched object shortly after launch which means restricts further movement of the arrested or captured missile.

It is a still further object of the present invention to provide an arresting device for restraining and capturing a launched vehicle such as a missile after the vehicle has been in free flight for a selected period of time.

It is a still further object of the present invention to provide an arrestor for arresting a missile in free flight, the duration of flight permitting measurement of the missile parameters such as shock, vibration and acceleration by means of a direct wire connection to the missile.

Other objects and many of the attendant advantages of this invention will be readily appreciated as the same becomes better understood by reference to the following detailed description when considered in connection with the accompanying drawings in which like numerals designate like parts throughout and wherein.

The present invention provides a device by means of which missile performance may be observed and measured by personnel in relatively close proximity thereto which is made possible through a restraining means by which the missile is brought under control after a selected relatively short duration of free flight. The missile is recaptured in undamaged condition and therefore may be fired over and over again. The capability of using a single missile for several tests reduces the cost of the missile test program. The system of the present invention is capable of launching, controlling and recovering missiles of various sizes and power with the only limit being the strength of the restraining and capturing devices.

Figure 1:
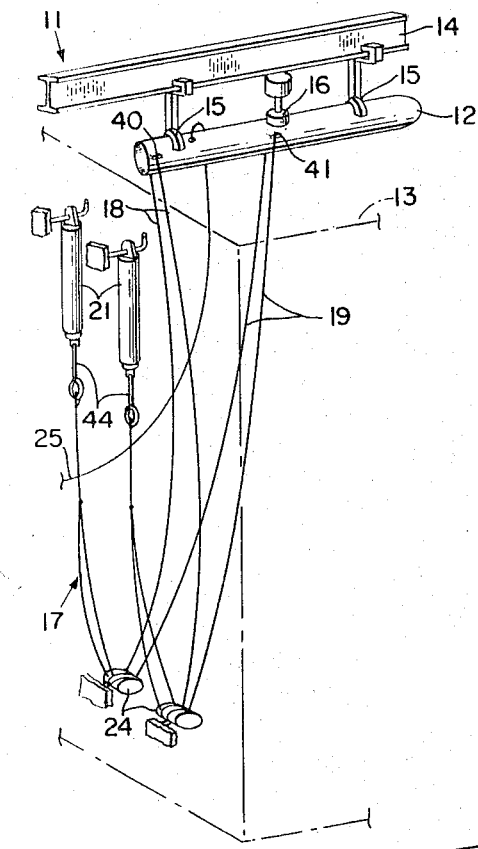
FIG. 1 is a view partly in perspective of one embodiment of the present invention.

Referring now to FIG. 1, there is shown a missile launch test device of the present invention which includes three basic components, the first of which is a support means 11 for movably positioning a missile 12 in a selected attitude prior to launching. The missile supporting and positioning means may include an upright structure such as test stand 13 and a simple structural member such as I-beam 14 which may have attached thereto brackets 15 for releasably holding the missile in relation to the beam. An ejection component or expulsion means such as a piston 16 may be positioned substantially above the center of gravity of the missile for imparting a selected downward thrust to the missile upon launch thereof.

The second component 17 of the invention includes means, preferably flexible, for restraining the missile in flight after the missile has been launched. In the present embodiment, this restraining means is in the form of two pairs of cables, 18 and 19, attached at one end to the missile and which may be attached at the other end to shock absorbing means such as pressurized cylinders 21 which in turn are attached to a stationary structure such as test stand 13. The cables preferably are led through sheaves in blocks as at 24 to permit the missile to assume a selected position in space when under power and while being restrained by the restraining means. An umbilical cord 25 may be attached to the missile for transmitting performance data.

The third component 27 provides for controlling deviations in yaw and pitch of the missile while it is restrained by the restraining means as well as for nestling the missile at the extremity of its advance. This component may take the form of a cubical tier or lattic work of flexible cords 30, preferably of nylon, which are mounted on upright frame members such as rods 31, the entire assembly being interposed in the path of the missile so as to receive the nose and forward portion of the missile when the missile is under restraint of the restraining means. The frame members 31 may be mounted on base bars 32 which may extend beyond the cubical tier in the direction of approach of the missile 12. Base bars 32 may support a bed for the missile in the form of a layer of cords 35 which may be similar to cords 30 and which provide a resting place for the missile when there is insufficient thrust to maintain it in flight. The cords 30 and 35 preferably are disposed transverse to the direction of missile flight and may have a length substantially one to one and one-half times the expected yaw deviation of the missile and be disposed over an area deep enough to cover from one-half to one and one-half times the misile length. The cubical tier should also be high enough to cover one and one-half times the vertical or pitch deviation of the missile trajectory when the missile has been ejection launched. The confining means of the third component preferably is positioned a distance from the launching component which is determined by the desired free travel of the missile for a particular test. The flexible members in the confining means should be capable of absorbing at least one-half of the vertical component of energy of the missile before breaking. It is desirable to space apart the flexible means in height and depth a distance equivalent to substantially two-thirds of the diameter of the missile.

As illustrated in FIG. 1, the launching portion of the invention comprises an extended supporting means such as I-beam 14 which is capable of supporting the missile and all control components connected with the launch thereof. Such a support member may be a framework of angle irons or other structural members and preferably should extend from and be supported by a column or other structure such as test stand 13 of suitable rigidity. Attached to the supporting means to position the missile in a desired attitude may be at least a pair of brackets 15 which are releasably connected to the missile and may be actuated by remote control. Also attached to the I-beam is a means for imparting downward thrust to the missile upon release of the brackets which means may be the ejection means or piston 16 which preferably is positioned above the center or gravity of the missile and which forces the missile downwards in timed sequence to the release of the brackets. Attached to the missile body are at least two pairs of pad eyes 40 and 41 or similar fixtures to which pairs of restraining cables 18 and 19 may be attached. One pair of pad eyes 40 preferably is positioned at the after end of the missile and the other pair 41 may be positioned at a point intermediate the aft and forward ends so as to provide maximum control of deviations in yaw of the missile. The cables or other cord-like members 18 and 19 may be attached to each pad eye and led therefrom preferably through the sheaves in blocks 24, which may be attached to the test stand 13 or other vertical support, and from the sheaves to the shock absorbing members 21 which in turn also may be attached to the test stand. The cable pairs may be joined intermediate the sheave and the shock absorbing means and sections of somewhat more elastic line 44 such as nylon rope may be attached at the end of the joined cables to connect such ends to the shock absorbing means. The sections of additional line serve to lessen the high initial shock occurring when a strain is taken on cables 18 and 19.

Figure 3:
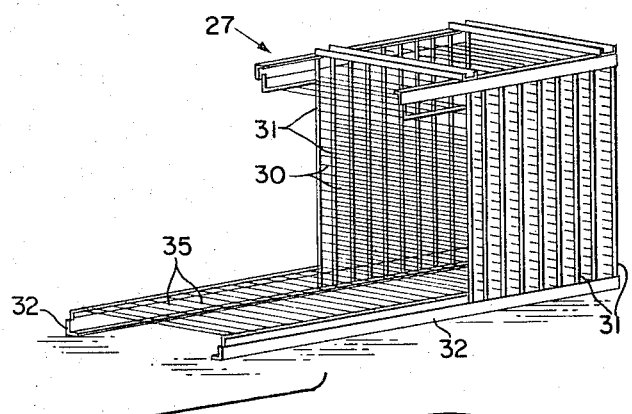
FIG. 3 is an enlarged section taken along lines 3—3 of FIG. 2.
Figure 2:
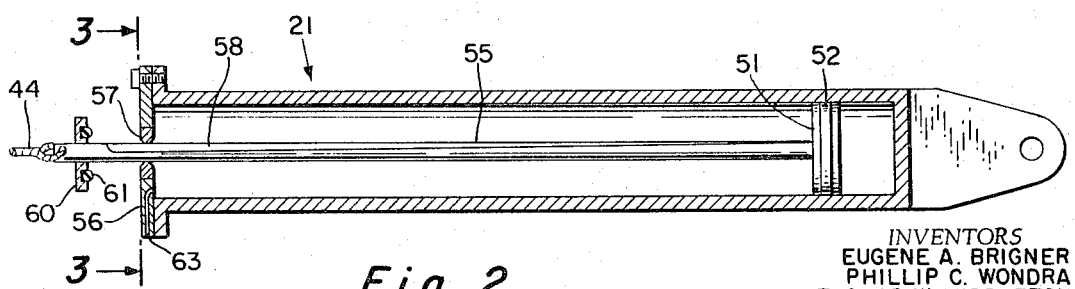
FIG. 2 is an enlarged view in section of one of the components of FIG. 1.

The shock absorbing means may be any form of tension or compression means which when extended provides a constant resistance to movement. One such tension means is shown in FIG. 2 and includes an elongate cylinder and piston assembly 21 in which the piston 51 may be sealed against the cylinder walls by O-rings 52 or other similar means and the piston rod 55 may extend through an end plate 56, shown in an enlarged view in FIG. 3, which may include a journal in the form of insert 57 accommodating the shaft in a close fitting relationship. Piston rod 55 may be provided with a plurality of grooves 58 which preferably taper from the full diameter of the shaft at the piston to a selected depth at the end of the shaft remote from the piston. The cross-section of the shaft shown in FIG. 3 illustrates the depth the tapering grooves may have at the point where the section is taken. The grooves terminate at a point within the cylinder when the piston is at the beginning of a stroke and present varying depths at insert 57 during a stroke. A closure plate 60 may be mounted on piston rod 55 and may have mounted thereon an O-ring 61 for sealing the interior of the cylinder when the piston is at the beginning of a stroke. An inlet 63 may be provided in plate 56 to permit pre-pressurization of the cylinder with any suitable gas.

In operation, missile 12 is prepared for launching and releasably attached to supporting means 14 by brackets 15. Piston 16 is set ready for actuation and cord 25 is attached preferably to the rear portion of the missile. One form of test may require that the missile be a specified distance below the supporting means or member before ignition of the rocket motor. To achieve this result at least an additional pair of cables, not shown, whose effective length is equal to the desired specified distance may be severably attached to the missile and the supporting member so as to separate from the missile at such distance and in addition act to ignite the rocket motor at separation. Where there are no cables for spacing the missile from the supporting means, or even where there are such cables, the missile next is ejected downward and released from brackets 15 simultaneously. If spacing cables are present, the rocket motor is ignited upon such cables being separated from the missile. If there are no spacing cables, ignition is effected as desired by a signal transmitted through the umbilical cord 25. With the missile rocket motor ignited, thrust should immediately be developed which will provide a forward component of force to the missile as it continues its downward fall. The missile now will be in free flight and data concerning its performance may be relayed to a monitoring station via cord 25. Upon the missile proceeding in free flight downward and forward to a point where a strain is taken on the restraining cables, the end of the free flight will have been reached and the missile then will be arrested under the application of a constant force which is obtained through the varying depth of grooves 58 in piston rod 55 of the shock absorbing member.

Nylon cords 44 which have been placed in the restraining lines intermediate the shock absorbers and the cables act to prevent cables 18 and 19 from parting upon the initial strain being taken. Next, the missile under partial restraint penetrates cubical tier 27 at some point during the stroke of piston 51, and once the nose of the missile enters the cubical tier the missile is additionally restrained from pitch movement thereby preventing it from moving upward or downward in an arc whose radius is determined by the length of the cables from the missile to blocks 24. It has been noted in tests wherein other restraining means, not shown, where used that a missile will sometimes enter the cubical tier and then be ejected therefrom by the increase in tension of the cords occasioned by the momentum of the missile. When such ejection occurred, the missile fell onto layer of cords 35 after which it was again driven into the tier of cords by continued operation of its motor. Upon cessation of flight sustaining thrust, the missile falls to the layer or bed of cords thereby being recoverable without having sustained damage of any significant amount.

It will thus be appreciated that the missile arresting or restraining device of the present invention provides for recovery of test missiles in virtually undamaged form through absorbing the energy in the missile and restricting its vertical travel so that shock, vibration, acceleration and other data may be obtained. The energy absorption and restriction in travel occur after the missile has been launched into free flight and after a period of build up from no momentum to and through full thrust. The expended missile is available in virtually undamaged condition so that the causes of component failure and the degree of these or other failures readily may be determined. Such data may be obtained for a variety of free flight distances by merely varying the distance from the launcher to the first plane of cords in the cubical tier encountered by the missile.

The present invention permits two tests to be combined into one, namely, a launcher test and a restrained motor firing test. Both tests are non-destructive and permit the accumulation of data on the interaction of shock, vibration and acceleration forces. By the present invention, missiles may be repeatedly flight tested and examined thereafter so that changes may be effected to perfect a missile without the expeditures occasioned in an expensive prototype missile system.

It will be recognized that many modifications and variations of the present invention are possible, such as replacing the cubical tier with a multiple buffer system, in the light of the above teachings. It is therefore to be understood that within the scope of the appended claims the invention may be practiced otherwise than as specifically described.

We claim:

1. A device for providing free flight test and recovery of a missile or other body launched at a high acceleration rate comprising:
   a structure for releasably supporting said missile;
   flexible restraining means connected at one end to selected points on said missile and at their other ends to said structure for limiting movement of said missile to a selected distance from said structure;
   means for imparting acceleration to said missile;
   means for actuating said acceleration imparting means;
   arresting means interposed in the path of said missile at a position substantially at said selected distance from said structure for reducing the momentum of said missile and restricting movement thereof about at least one axis of motion;
   said restraining means including a least a pair of cables connecting the after portion of said missile to said structure and an additional pair of cables connecting the mid-portion of said missile to said structure; whereby both pairs of cables act to stop said missile within said selected distance of said structure and inhibit roll of said missile, and the pair of cables connected to the mid-portion of said missile acting to inhibit yaw of said missile.

2. The device as defined in claim 1 wherein said restraining means includes shock absorbing means capable of applying a constant restraining force so as to decelerate said missile at a constant rate.

3. A device for providing free flight test and recovery of a missile or other body launched at a high acceleration rate comprising:
   an upright structure having a support extending outward therefrom for releasably supporting said missile;
   expulsion means interposed between adjacent surfaces of the missile and the support for forcibly separating said missile and said support;
   brackets extending outward from the support and releasably engaging the missile;
   at least one cable means connecting the after end of the missile and the structure;
   said cable means having a selected length so as to permit said missile to transverse a selected distance from said structure;
   recovery means including a cubical tier of flexible cords positioned substantially said selected distance from said structure and which extend transversely across the flight path of said missile for intercepting the missile and restraining movement thereof at least about one axis of motion; and
   means for imparting acceleration to said missile at a selected time after forcible release thereof from said support;
   whereby said missile may be accelerated in free flight for a selected distance and then recovered virtually undamaged for reuse.

4. The device as defined in claim 3 wherein said recovery means further includes shock absorbing means capable of applying a constant restraining force so as to decelerate said missile at a constant rate.

5. The device as defined in claim 3 and further including at least two additional cable means one attached to each side of said missile at a point intermediate the forward end and after end thereof and extending to said structure;
   said additional cable means having a slack commensurate with the slack in said cable means;
   whereby movement of said missile about the yaw axis is prevented.

6. The device as defined in claim 3 wherein said recovery means includes a bed having at least one layer of cords disposed intermediate said cubical tier and said structure for preventing damage to said missile during and at the termination of the test.

7. In a missile test device, the combination of:
   retrieving means including a cubical tier formed of a plurality of frame members disposed transverse to and intercepting the flight path of a missile being tested;
   a plurality of cords tightly drawn across the frame members in a direction transverse to the plane of motion in pitch of the missile being tested;
   said cords being of an extensible material;
   said cords spaced apart a distance of the order of two-thirds the diameter of the test missile;
   said cubical tier positioned substantially at the extremity of travel of the test missile;
   whereby said cords will assist in stopping the missile being tested and further will restrain movement of the missile about the pitch axis thereby serving to trap the missile without significant damage thereto.

8. The retrieving means as defined in claim 7 and further including at least one layer of cords disposed at the base of said cubical tier and extending in the direction of approach of the test missile so as to catch and protect the missile from damage after completion of the test.

9. In a missile test device, the combination with a retrieving device of:
   a plurality of cables of selected length each attached at one end to said missile and at the other end to a test stand;
   at least a pair of said cables attached to opposite sides of the after portion of a test missile;
   at least another pair of said cables attached to opposite sides of the mid-portion of the missile; and
   said cables led through sheave means disposed opposite said retrieving device, and connected to a test stand;
   whereby the test missile upon launch will traverse a selected distance and through the positioning of the sheave means will be directed into said retrieving means.

10. The device as defined in claim 9 and further including shock absorbing means interposed intermediate the cable ends remote from the missile and the test stand;

said shock absorbing means including for each pair of cables a pressurized cylinder having a piston, a piston rod and an orifice accommodating the piston rod;

each of said piston rods connected to a pair of said cables;

said piston rods having grooves extending therealong which taper from the rod diameter at the piston to a selected depth at a point adjacent the end remote from the piston so that as the test missile accelerates after ignition successfully smaller groove areas occur at said orifice thereby increasing resistance to piston motion as the missile accelerates.

References Cited by the Examiner
UNITED STATES PATENTS

| | | | |
|---|---|---|---|
| 2,964,031 | 12/1960 | Dotson | 124—11 |
| 3,081,626 | 3/1963 | Shaller | 73—167 |
| 3,128,972 | 4/1964 | Fonden et al. | 244—110 |
| 3,218,849 | 11/1965 | Marvinney et al. | 73—167 X |
| 3,258,227 | 6/1966 | Girolamo et l. | 244—110 X |

DAVID SCHONBERG, *Primary Examiner.*